United States Patent
Kwan et al.

(10) Patent No.: US 7,442,725 B2
(45) Date of Patent: Oct. 28, 2008

(54) COLOR CHANGING CORRECTION FLUID

(75) Inventors: Wing Sum Vincent Kwan, Chicago, IL (US); Jiandong Zhu, Aurora, IL (US)

(73) Assignee: Sanford, L.P., Oak Brook, IL (US)

( * ) Notice: Subject to any disclaimer, the term of this patent is extended or adjusted under 35 U.S.C. 154(b) by 178 days.

(21) Appl. No.: 10/776,860

(22) Filed: Feb. 11, 2004

(65) Prior Publication Data

US 2005/0075419 A1    Apr. 7, 2005

Related U.S. Application Data

(60) Provisional application No. 60/508,095, filed on Oct. 2, 2003.

(51) Int. Cl.
C09D 11/00    (2006.01)

(52) U.S. Cl. .............. 523/161; 106/31.17; 106/31.19; 523/160

(58) Field of Classification Search ............... 523/161, 523/160; 106/31.17, 31.19
See application file for complete search history.

(56) References Cited

U.S. PATENT DOCUMENTS

| | | | | |
|---|---|---|---|---|
| 2,029,152 A | 1/1936 | Bonkowski | ............... | 120/36 |
| 3,941,488 A | 3/1976 | Maxwell | ............... | 401/17 |
| 3,985,455 A | 10/1976 | Wahlberg | ............... | 401/30 |
| 4,032,491 A * | 6/1977 | Schoenke | ............... | 524/68 |
| 4,128,508 A * | 12/1978 | Munden | ............... | 512/1 |
| 4,148,591 A | 4/1979 | Tomura | ............... | 401/32 |
| 4,156,657 A | 5/1979 | Lin | ............... | 252/188.3 R |
| 4,170,669 A * | 10/1979 | Okada | ............... | 427/275 |
| 4,172,064 A * | 10/1979 | Keeler | ............... | 524/762 |
| 4,213,717 A | 7/1980 | Lin | ............... | 401/18 |
| 4,227,930 A | 10/1980 | Lin | ............... | 106/19 |
| 4,228,028 A | 10/1980 | Lin | ............... | 252/188.3 R |
| 4,243,417 A * | 1/1981 | Grourke et al. | ............... | 106/14.13 |
| 4,252,845 A | 2/1981 | Griffiths et al. | ............... | 427/273 |
| 4,283,320 A * | 8/1981 | Carroll et al. | ............... | 524/522 |
| 4,349,639 A | 9/1982 | Muller | ............... | 523/161 |
| 4,365,035 A * | 12/1982 | Zabiak | ............... | 524/283 |
| 4,509,875 A | 4/1985 | Shintani | ............... | 401/34 |
| 4,557,618 A | 12/1985 | Iwata et al. | ............... | 401/34 |
| 4,580,918 A | 4/1986 | Baker et al. | ............... | 401/29 |
| 4,865,479 A | 9/1989 | Doll | ............... | 401/17 |
| 5,026,189 A | 6/1991 | Keil | ............... | 401/29 |
| 5,033,895 A | 7/1991 | Aida | ............... | 401/131 |
| 5,139,572 A | 8/1992 | Kawashima | ............... | 106/21 |
| 5,196,243 A * | 3/1993 | Kawashima | ............... | 428/29 |
| 5,215,956 A | 6/1993 | Kawashima | ............... | 503/201 |
| 5,232,494 A | 8/1993 | Miller | ............... | 106/22 B |
| 5,236,987 A * | 8/1993 | Arendt | ............... | 524/287 |
| 5,256,191 A | 10/1993 | Thompson et al. | ............... | 106/19 A |
| 5,326,388 A | 7/1994 | Miller et al. | ............... | 106/22 B |
| 5,338,123 A | 8/1994 | Obersteller et al. | ............... | 401/34 |
| 5,370,471 A | 12/1994 | Kageyama et al. | ............... | 401/52 |
| 5,418,013 A * | 5/1995 | Detrick et al. | ............... | 427/340 |
| 5,464,470 A | 11/1995 | Brachman et al. | ............... | 106/22 A |
| 5,478,382 A | 12/1995 | Miller et al. | ............... | 106/22 B |
| 5,486,228 A | 1/1996 | Miller et al. | ............... | 106/22 B |
| 5,489,331 A | 2/1996 | Miller et al. | ............... | 106/22 B |
| 5,492,558 A | 2/1996 | Miller et al. | ............... | 106/22 B |
| 5,498,282 A | 3/1996 | Miller et al. | ............... | 106/22 |
| 5,498,285 A | 3/1996 | Hooykaas | ............... | 106/486 |
| 5,499,881 A | 3/1996 | Chang | ............... | 401/17 |
| 5,509,742 A | 4/1996 | Balzarini | ............... | 401/17 |
| 5,649,999 A * | 7/1997 | Wang | ............... | 106/31.32 |
| 5,762,077 A | 6/1998 | Griffiths, Jr. | ............... | 132/74.5 |
| 5,872,162 A | 2/1999 | McHugh et al. | ............... | 523/161 |
| 5,877,234 A | 3/1999 | Xu et al. | ............... | 523/161 |
| 5,916,357 A | 6/1999 | Wang et al. | ............... | 106/31.23 |
| 5,964,931 A | 10/1999 | Korper | ............... | 106/31.93 |
| 5,964,932 A | 10/1999 | Ison et al. | ............... | 106/35 |
| 5,997,891 A | 12/1999 | Fuerst et al. | ............... | 424/401 |
| 6,149,721 A | 11/2000 | Wang et al. | ............... | 106/31.32 |
| 6,179,501 B1 | 1/2001 | Fulop | ............... | 401/34 |
| 6,221,432 B1 | 4/2001 | Wang et al. | ............... | 427/337 |

(Continued)

FOREIGN PATENT DOCUMENTS

CN    1161911    10/1997

(Continued)

OTHER PUBLICATIONS

Machine Translation JP 08-134387 A (1996).*

(Continued)

*Primary Examiner*—Edward J Cain
(74) *Attorney, Agent, or Firm*—Marshall, Gerstein & Borun LLP

(57) ABSTRACT

An improved color changing correction fluid is provided which includes either a volatile base or a volatile acid in combination with a color changing pH indicator, all in a water based fluid or system. As the fluid dries, the volatile base or acid evaporates along with the water and the pH color changing indicator changes from a colored state to a clear state. For white paper, a white pigment is utilized and therefore the fluid changes from a colored state to a white finished state as the solvent water and acid or base evaporates. Different color pigments can be utilized to match the color of the particular paper or substrate.

29 Claims, No Drawings

U.S. PATENT DOCUMENTS

| | | | | |
|---|---|---|---|---|
| 6,276,853 | B1 | 8/2001 | Breidenbach et al. | 401/34 |
| 6,357,943 | B1 | 3/2002 | Kuang | 401/17 |
| 6,412,998 | B1 | 7/2002 | Ham | 401/17 |
| 6,489,892 | B2 | 12/2002 | Lawandy | 340/572.3 |
| 6,491,464 | B1 | 12/2002 | Young | 401/35 |
| 6,554,516 | B1 | 4/2003 | Christopher | 401/31 |
| 6,894,095 | B2 * | 5/2005 | Russo et al. | 524/249 |
| 2002/0103283 | A1 * | 8/2002 | Elfring et al. | 524/425 |
| 2002/0151648 | A1 * | 10/2002 | Fasano et al. | 525/71 |
| 2005/0143505 | A1 * | 6/2005 | Rosekelly et al. | 524/236 |

FOREIGN PATENT DOCUMENTS

| | | | |
|---|---|---|---|
| EP | 488980 | A1 * | 6/1992 |
| EP | 549145 | A1 * | 6/1993 |
| FR | 2749220 | | 12/1997 |
| JP | 59124966 | A * | 7/1984 |
| JP | 6049397 | | 2/1994 |
| JP | 08134387 | A * | 5/1996 |
| JP | 2001158196 | | 6/2001 |

OTHER PUBLICATIONS

Ikeno, Sangyo, English Language Abstract of Japanese Patent 06049397A issued Feb. 22, 1994.

Kawashima, English Language Abstract of Japanese Patent 59124966A issued Jul. 19, 1984.

International Search Report issued Dec. 30, 2004.

* cited by examiner

COLOR CHANGING CORRECTION FLUID

CROSS REFERENCES TO RELATED APPLICATION

This application claims the benefit under 35 U.S.C. § 119(e) of U.S. provisional patent application Ser. No. 60/508,095 filed Oct. 2, 2003, the disclosure of which is incorporated herein by reference.

BACKGROUND

Technical Field

Improved correction fluid compositions are disclosed. More specifically, correction fluid compositions are disclosed which change color upon drying to indicate to the user when the correction fluid has sufficiently dried and therefore can be written or printed upon.

Correction fluids are used for correcting handwritten, typewritten, photocopied and printed markings on paper, cardboard and other surfaces. Generally, such correction fluids are applied to the surface in a liquid form and then subsequently allowed to dry to form a film which covers the incorrect markings on the surface. After drying, the coating of correction fluid can then be written upon to form the corrected marking.

Important characteristics for any correction fluid is the ability to provide a film or coalesced residue on the surface which can both effectively cover the incorrect marking and provide an effective service for receiving the correcting marking. The film covering the marking should be strongly bonded to the paper or substrate surface but also should be sufficiently flexible so that the film will not be removed or cracked during normal handling of the paper. Additionally, the correction fluid should not interact with the corrected marking which would result in discoloration of the resulting film or a "bleed through" of the incorrect marking through the correction fluid layer.

Another important characteristic of any correction fluid is the drying rate of the fluid. Specifically, the drying rate should be as rapid as possible so that the correction can be made relatively quickly. Typical correction fluids having a drying time ranging from 30 to 40 seconds depending upon the thickness of the coating applied. Other desired performance characteristics include good storage ability, good flow and viscosity characteristics and the ability of the fluid to be mixed quickly and/or remain in a suspension for long periods of time.

Early correction fluids included organic solvents but in recent times water-based correction fluids have been utilized because they are better for the environment. Typically water-based correction fluids include a pigment, e.g., titanium dioxide, and a film forming polymer, such as latex.

One problem associated with current water-based correction fluids is the inability for the consumer to determine when the correction fluid has sufficiently dried so as to enable the consumer to write over it. Currently, the consumer is forced to employ a trial and error technique. If the consumer does not wait a sufficient amount of time, e.g., greater than 30 seconds, the consumer's pen will penetrate the partially-dried film resulting in the incorrect marking being partially uncovered as well as an unsmooth surface. Then, the consumer must reapply another coat of correction fluid and wait all over again.

One solution to this problem is disclosed in Japanese Patent No. JP 6049397 which discloses a correction fluid formulation that includes water, a volatile organic solvent such as ethanol or acetone and a pH color changing indicator. The formulation relies upon the reaction with carbon dioxide in air that results in a pH change (the mixture becomes less basic or more acidic) to provide the lowering of the pH resulting in the color change of the pH color changing indicator. However, two different solvents are required, water and a polar organic solvent, and the reliance upon the interaction of the mixture with carbon dioxide for producing the color change is slow and unreliable.

Therefore, there is a need for an improved correction fluid formulation which provides a reliable visual indication to the user when the correction fluid is sufficiently dry and ready to receive written or printed corrections.

SUMMARY OF THE DISCLOSURE

In satisfaction of the aforenoted needs, an improved correction fluid is disclosed which changes color upon drying to provide the user with a reliable indication that the correction fluid is sufficiently dry and ready to receive corrected markings in the form of writing or printing. In an embodiment, an improved color changing correction fluid comprises water as the sole solvent, either a volatile base or a volatile acid, and a color changing pH indicator. Preferably, the color changing correction fluid does not include substantial amounts of organic solvents of either a polar or non-polar nature.

In a refinement, a volatile base is employed and is selected from the group consisting of tri-ethylamine (TEA), 2-amino-2-methyl-1-propanol (AMP), dimethylaminopropylamine (DMAPA), N,N-dimethylethanolamine (DMEA), arnmonia and mixtures thereof.

In another refinement, a volatile acid is used which comprises acetic acid and/or another volatile acid such as formic acid and mixtures of volatile acids.

In another refinement, the color changing pH indicator is selected from the group consisting of pentamethoxy red, methyl red, methyl yellow, phenolphthalein, thymolphthalein, p-naphtholbenzein, 4-nitrophenol, 3-nitrophenol o-cresolphthalein, m-cresol red, thymol blue, m-cresol purple and mixtures thereof.

In another refinement, the color changing correction fluid further comprises a film-forming polymer. In a further refinement, the film-forming polymers are stable at a high pH of about 13 down to a low pH of about 4, has a solids level ranging from about 35% to about 65% and a glass transition temperature ($T_g$) ranging from about −35 to about 100° C.

In a further refinement, the film-forming polymer is selected from the group consisting styrene acrylic latexes, acrylic latexes, vinyl acetate ethylene latexes and mixtures thereof. Further, a coalescent aid can be used to enhance the film-forming process although some polymers disclosed herein can form films without coalescent aids. If a coalescent aid is utilized, plasticizers are preferred and can be selected from the group consisting of dipropylene glycol dibenzoate, isodecyl benzoate, ditridecylphthalate, and mixtures thereof.

In a further refinement, titanium dioxide is a preferred pigment and can constitute from about 20 to about 60 wt % of the fluid mixture. Additional extender pigments can be utilized such as aluminum silicate, calcium carbonate, magnesium silicate, calcium silicate, potassium aluminum silicate and mixtures thereof.

The viscosity of the resulting correction fluid at 25° C. is preferably between 5 and 20,000 cps. However, this range can be extended, depending on the particular applicator utilized, i.e., a brush or stylus. For example, the viscosity at 25° C. could range from about 10 to about 800 cps for brush or foam applicators, from about 5 to about 100 cps for correction markers and from about 20 to about 20,000 cps for pens that require the correction fluid to be squeezed through a stylus from a flexible reservoir. The solids level in the preferred color changing correction fluids range from about 45 to about 75% by weight, and more preferably from about 55 to about 70% by weight.

Additional additives such as biocides, defoamers, surface tension modifies, pigment dispersants, surfactants, anti-settling agents, freeze-thaw stabilizers, thickeners and other additives can be utilized that are known to those skilled in the art.

DETAILED DESCRIPTION OF THE PRESENTLY PREFERRED EMBODIMENTS

An improved color changing correction fluid made in accordance with this disclosure includes water as the primary solvent, thereby avoiding the need for organic solvents and the environmental concerns associated therewith, a volatile base or acid and a color changing pH indicator. Preferred volatile bases include diethylenetriamine (DETA), dimethylaminopropylamine (DMAPA), methoxypropylamine (MPA), triethylamine (TEA), 2-amino-2-methyl-1-propanol (AMP), N,N-dimethylethanolamine (DMEA), ammonia and mixtures thereof. If a volatile acid is utilized, a preferred volatile base is acetic acid because of its relative volatility, low cost, environmental friendliness and lack of unpleasant odors associated therewith.

Preferably, the volatile base or acid constitutes from about 0.1 to about 10 wt % of the fluid mixture. Further, a mixture of different amines can be advantageous. For example, the combination of ammonia which is a quickly evaporating amine with DMEA, which is slowly evaporating amine, can be effective. Further, a combination of TEA as a quickly evaporating amine with AMP as a slowly evaporating amine can be utilized.

Preferred color changing pH indicators include pentamethoxy red, methyl red, methyl yellow, phenolphthalein, thymophthalein, p-naphtholbenzein, 4-nitrophenol, 3-nitrolphenol, o-cresolphthalein, m-cresol red, thymol blue, m-cresol purple and mixtures thereof.

The correction fluid should also include a film-forming polymer and possibly a film-forming aid or coalescent aid. Suitable film-forming polymers are stable at a pH of up to about 13 and a pH of down to about 4, have a solid level from about 35% to about 65% in a glass transition temperature ($T_g$) ranging from about −35 to about 100° C. Suitable film-forming polymers include Pliotech™ 7822 or 7217 (acrylic latexes sold by Eliokem), Joncroyo™ 537, 617, 1907, 2561, 2646 or 2660 (acrylic latexes sold by Johnson Polymers), Jonrez™ 2051, 2080, 2008 or 2005 (styreneacrylic latexes sold by Westvaco), Durvace™ FT-3020 (vinyl acetate ethylenes latex sold by Reichhold), Ucar™ latexes (sold by Don Chemical) and other latexes meeting conditions aforementioned. Suitable coalescent aids include Benzoflex™ 9-88 (dipropylene glycol dibenzoate sold by Velsicol Chemical Corp.) Velate™ 262 and 368 (isodecyl benzoate, also sold by Velsicol Chemical Corp), Texanol™ (ester alcohol sold by Eastman Chemical), Jayflex™ (ditridecyl phthalate sold Exxon Mobil Chemical).

The preferred pigment is titanium dioxide in an amount ranging from about 20 to about 60 wt %, preferably from about 35 to about 50 wt %. Suitable titanium dioxide pigments include Ti-Pure™ R-931, 902, 706 (sold by DuPont), Tioide™ R-XL, TR90 (sold by Huntsman), Kronos™ 2131 (sold by Kronos), and Tipaque™ R-930, R-980 (sold by Ishihara) and many other titanium dioxide pigments meeting conditions aforesaid. An extender pigment may also be utilized and suitable extender pigments include, but are not limited to aluminum silicate, calcium carbonate, magnesium silicate, calcium silicate, potassium aluminum silicate and mixtures thereof.

Formulation of the color changing correction fluid will be best illustrated by the following examples.

EXAMPLE 1

137.5 g Kronos 2131 titanium dioxide pigments was dispersed in 55 g water and proper amount of pigment dispersants and defoamers. Then under mixing, 40 g of Pliotec 7822 latex, 2 g TXIB coalescent, 2 g AMP-95 and 2 g DMAPA, 0.6 g phenolphthalein pH indicator and other additives were added. The resulting fluid can be applied to paper for correction by either brush and/or foam applicator.

EXAMPLE 2

In 60 g water with pigment dispersant and defoamer, 137.5 g TiPure R-902 titanium dioxide was added and dispersed. Then 25.4 g Joncryl 2646 and 6.7 g Joneryl 537 latex, 4 g DMAPA, 0.6 g o-cresolphthalein and other additives were mixed. The fluid was applied by either brush and/or foam applicator for correction.

The fluids prepared as set forth above were subjected to both room temperature and accelerated aging experiments. Both fluids showed good stability.

While only certain embodiments have been set forth, alternative embodiments and various modifications will be apparent from the above description to those skilled in the art. These and other alternatives are considered equivalents within the spirit and scope of this disclosure.

What is claimed is:

1. A color changing correction fluid comprising:
water;
titanium dioxide in an amount from about 35 weight percent to about 60 weight percent;
a volatile base; and
a color changing pH indicator.

2. The color changing correction fluid of claim 1 wherein the volatile base is selected from the group consisting of tri-ethylamine (TEA), 2-amino-2-methyl-1-propanol (AMP), dimethylaminopropylamine (DMAPA), N,N-dimethylethanolamine (DMEA), ammonia and mixtures thereof.

3. The color changing correction fluid of claim 1 wherein the color changing pH indicator is selected from the group consisting of phenolphthalein, thymolphthal, p-naphtholbenzein, 4-nitrophenol, 3-nitrophenol, o-cresolphthalein, m-cresol red, thymol blue, m-cresol purple and mixtures thereof.

4. The color changing correction fluid of claim 1 further comprising a film-forming polymer.

5. The color changing correction fluid of claim 4 wherein the film-forming polymer selected from the group consisting of styrene acrylic latex, vinyl acetate ethylene latex and mixtures thereof.

6. The color changing correction fluid of claim 5 may further comprise a coalescent aid.

7. The color changing correction fluid of claim 6 wherein the coalescent aid is selected from the group consisting of dipropylene glycol dibenzoate, isodecyl benzoate, ditridecyl phthalate, glycol ether and mixtures thereof.

8. The color changing correction fluid of claim 1 further comprising an extender pigment.

9. The color changing correction fluid of claim 8 wherein the extender pigment is selected from the group consisting of aluminum silicate, calcium carbonate, magnesium silicate, calcium silicate, potassium aluminum silicate and mixtures thereof.

10. A color changing correction fluid comprising:
water;
titanium dioxide in an amount from about 35 weight percent to about 60 weight percent;
a volatile acid; and
a color changing pH indicator.

11. The color changing correction fluid of claim 10 wherein the volatile acid is selected from the group consisting of acetic acid, formic acid and mixtures thereof.

12. The color changing correction fluid of claim 10 wherein the color changing pH indicator is selected from the group consisting of pentamethoxy red, methyl red, methyl yellow, phenolphthalein, thymolphthalein, p-naphtholbenzein, 4-nitrophenol, 3-nitrophenol, o-cresolphtha, m-cresol red, thymol blue, m-cresol purple and mixtures thereof.

13. The color changing correction fluid of claim 10 further comprising a film-forming polymer.

14. The color changine correction fluid of claim 13 wherein the film-forming polymer selected from the group consisting of styrene acrylate, styrene acrylic, acrylic, vinyl acetate ethylene polymers, vinylidene chloride and mixtures thereof.

15. The color changing correction fluid of claim 14 may further comprise a coalescent aid.

16. The color changing correction fluid of claim 15 wherein the coalescent aid is selected from the group consisting of dipropylene glycol dibenzoate, isodecyl benzoate, ditridecyl phihalate, glycol ether and mixtures thereof.

17. The color changing correction fluid of claim 10 further comprising an extender pigment.

18. The color changing correction fluid of claim 17 wherein the extender pigment is selected from the group consisting of aluminum silicate, calcium carbonate, magnesium silicate, calcium silicate, potassium aluminum silicate and mixtures thereof.

19. A method for correcting an error on a substrate, the method comprising:
covering the error with a coating of a color changing correction fluid comprising water, titanium dioxide in an amount from about 35 weight percent to about 60 weight percent, a volatile base, and a color changing pH indicator; and,
allowing the volatile base and water to evaporate thereby causing the color changing pH indicator of the fluid to change color as the fluid dries.

20. The method of claim 19 wherein the substrate is white and the color changing correction fluid is white after drying but is a non-white color when liquid.

21. A method for correcting an error on a substrate, the method comprising:
covering the error with a coating of a color changing collection fluid comprising water, titanium dioxide in an amount from about 35 weight percent to about 60 weight percent, a volatile acid, and a color changing pH indicator; and,
allowing the volatile acid and water to evaporate thereby causing the color changing pH indicator of the fluid to change color as the fluid dries.

22. The method of claim 21 wherein the substrate is white and the color changing correction fluid is white after drying but is a non-white color when liquid.

23. A color changing fluid comprising:
water;
titanium dioxide in an amount from about 35 weight percent to about 60 weight percent;
a volatile base or a volatile acid; and
a color changing pH indicator.

24. The color changing fluid of claim 23 wherein the volatile base is selected from the group consisting of tri-ethylamine (TEA), 2-amino-2-methyl-1-propanol (AMP), dimethylaminopropylamine (DMAPA), N,N-dimethylethanolamine (DMEA), ammonia and mixtures thereof.

25. The color changing correction fluid of claim 1 wherein the titanium dioxide is in an amount of about 35 weight percent to about 50 weight percent.

26. Th color changing correction fluid of claim 10 wherein the titanium dioxide is in an amount of about 35 weight percent to about 50 weight percent.

27. The method for correcting an error on a substrate of claim 19 wherein the titanium dioxide is in an amount of about 35 weight percent to about 50 weight percent.

28. The method for correcting an error on a substrate of claim 21 wherein the titanium dioxide is in an amount of about 35 weight percent to about 50 weight percent.

29. The color changing correction fluid of claim 23 wherein the titanium dioxide is in an amount of about 35 weight percent to about 50 weight percent.

* * * * *

UNITED STATES PATENT AND TRADEMARK OFFICE
CERTIFICATE OF CORRECTION

PATENT NO. : 7,442,725 B2
APPLICATION NO. : 10/776860
DATED : October 28, 2008
INVENTOR(S) : Wing Sum V. Kwan et al.

It is certified that error appears in the above-identified patent and that said Letters Patent is hereby corrected as shown below:

In the Claims:

At Column 4, line 50, "thymolphthal" should be
-- thymolphthalein --.

At Column 4, line 58, "styrene acrylic latex, vinyl acetate" should be
-- styrene acrylic latex, acrylic latex, vinyl acetate --.

At Column 5, line 19, "o-cresolphtha" should be
-- o-cresolphthalein --.

At Column 5, line 24, "color changine correction" should be
-- color changing correction --.

At Column 5, line 33, "ditridecyl phihalate" should be
-- ditridecyl phthalate --.

At Column 6, line 35, "Th color changing" should be
-- The color changing --.

Signed and Sealed this

Nineteenth Day of May, 2009

JOHN DOLL
*Acting Director of the United States Patent and Trademark Office*